US009952856B2

(12) United States Patent
Wetzold et al.

(10) Patent No.: US 9,952,856 B2
(45) Date of Patent: Apr. 24, 2018

(54) DEPLOYING MOBILE APPLICATIONS IN A COLLABORATIVE CLOUD ENVIRONMENT

(71) Applicant: SAP SE, Walldorf (DE)

(72) Inventors: Robert Wetzold, Heidelberg (DE); Martin Hermes, Muehlhausen (DE); Christian Halstrick, Heidelberg (DE); Marco Voelz, Heidelberg (DE); Dirk Sabiwalsky, Sandhausen (DE); Samir Zeort, Walldorf (DE)

(73) Assignee: SAP SE, Walldorf (DE)

( * ) Notice: Subject to any disclaimer, the term of this patent is extended or adjusted under 35 U.S.C. 154(b) by 120 days.

(21) Appl. No.: 14/449,910

(22) Filed: Aug. 1, 2014

(65) Prior Publication Data

US 2016/0034267 A1 Feb. 4, 2016

(51) Int. Cl.
*G06F 9/44* (2006.01)
*H04W 4/00* (2018.01)
*H04L 29/08* (2006.01)
*G06F 9/445* (2018.01)

(52) U.S. Cl.
CPC .................. *G06F 8/71* (2013.01); *G06F 8/60* (2013.01); *H04L 67/10* (2013.01); *H04W 4/003* (2013.01)

(58) Field of Classification Search
CPC .................................. G06F 9/44; G06F 9/445
USPC .................................................. 717/168–178
See application file for complete search history.

(56) References Cited

U.S. PATENT DOCUMENTS

| 6,684,383 | B1* | 1/2004 | Natori ....................... G06F 8/36 717/107 |
| 7,650,609 | B2 | 1/2010 | Klevenz et al. |
| 7,657,609 | B2 | 2/2010 | Klevenz et al. |
| 7,953,770 | B2 | 5/2011 | Sohn et al. |
| 8,214,410 | B2 | 7/2012 | Sohn et al. |
| 8,473,584 | B2 | 6/2013 | Sabiwalsky |
| 8,621,069 | B1* | 12/2013 | Tompkins ............. G06F 9/5027 709/223 |
| 8,645,922 | B2 | 2/2014 | Zeort |
| 2002/0066071 | A1* | 5/2002 | Tien .......................... G06F 8/20 717/102 |
| 2003/0023431 | A1* | 1/2003 | Neuberger .............. G10L 15/19 704/231 |
| 2010/0095197 | A1 | 4/2010 | Klevenz et al. |
| 2010/0131945 | A1 | 5/2010 | Zeort |
| 2010/0279733 | A1* | 11/2010 | Karsten ................. H04W 48/18 455/552.1 |
| 2010/0332401 | A1* | 12/2010 | Prahlad ............... G06F 17/3002 705/80 |

(Continued)

*Primary Examiner* — Jae Jeon
(74) *Attorney, Agent, or Firm* — Fish & Richardson P.C.

(57) ABSTRACT

The present disclosure describes methods, systems, and computer program products for providing a lightweight deployment of mobile cloud applications. A computer-implemented method comprises: receiving, at a server and from a remote client device, a first request to create a frame for the application; storing, by the server, the frame of the application in a repository; generating, by the server, an identifier associated with the frame and the repository; initiating, by the server, a copying of the repository to a workspace; and receiving, by the repository or the workspace and from the remote client, a pushing command including the identifier to update the frame stored in the repository or the workspace with application data associated with a created, modified or deleted version of the application.

20 Claims, 6 Drawing Sheets

(56) References Cited

U.S. PATENT DOCUMENTS

| | | |
|---|---|---|
| 2012/0030180 A1 | 2/2012 | Klevenz et al. |
| 2012/0158814 A1 | 6/2012 | Sabiwalsky |
| 2013/0031158 A1* | 1/2013 | Salsburg ............... G06F 9/5072 709/203 |
| 2013/0041756 A1* | 2/2013 | Carion ................ G06Q 30/0201 705/14.64 |
| 2013/0117289 A1 | 5/2013 | Fischer et al. |
| 2013/0132774 A1* | 5/2013 | Somendra ........... G06F 11/3688 714/32 |
| 2013/0212485 A1* | 8/2013 | Yankovich ............ G06F 9/4451 715/741 |
| 2014/0113560 A1* | 4/2014 | Graube ................... H04B 7/26 455/41.2 |
| 2014/0129328 A1* | 5/2014 | Mathew ................ G06Q 30/00 705/14.53 |
| 2014/0244716 A1* | 8/2014 | Stam ....................... H04L 67/10 709/203 |

\* cited by examiner

DEPLOYING MOBILE APPLICATIONS IN A COLLABORATIVE CLOUD ENVIRONMENT

TECHNICAL FIELD

The present disclosure relates to software, computer systems, and computer-implemented methods for providing a lightweight deployment of applications, such as cloud applications, on-premise applications, desktop applications or mobile applications.

BACKGROUND

Modern applications can enable customers to access and leverage updates efficiently. In many instances, customers can access data from a single application. For data exchange between different applications, data may need to be copied, transferred, or manipulated in other means to be used. For example, customer data stored in a sales order business product may be read and copied or duplicated to be useable in another business application or system. In some other instances, a central database (e.g., held by a third party) may also be used to provide copies of the business data to multiple applications or business products.

Lightweight mobile cloud applications, such as HTML5 applications, are a new type of web application that may heavily use client-side JavaScript in the presentation layer and communicate with backend services using AJAX requests. A prominent example of HTML5 applications are FIORI applications, which are user interface extensions based on backend services from either on-premise or on-demand applications. These applications may have to be customized and modified to tailor them according to the needs of the customers. Some of these modifications can be done in static content (HTML, CSS, or JavaScript) of the application. Traditionally, it may be required to have dedicated servers or virtual machines (VMs) for every customer-specific modification of an application, requiring excessive resource and time consumption as well as expense due to high costs for hosting and administration of the required infrastructure.

SUMMARY

The present disclosure describes computer-implemented methods, systems, and computer program products for providing a lightweight deployment of mobile cloud applications.

One or more of the following aspects of this disclosure can be embodied alone or in combination as methods that include the corresponding operations. One or more of the following aspects of this disclosure can be implemented alone or in combination in a device comprising a processor, a processor-readable medium coupled to the processor having instructions stored thereon which, when executed by the processor, cause the processor to perform operations according to the one or more of the following aspects. One or more of the following aspects of this disclosure can be implemented alone or in combination on a computer program product encoded on a non-transitory, tangible storage medium, the product comprising computer readable instructions for causing one or more computers to perform the operations according to the one or more of the following aspects.

A general aspect 1 includes a computer-implemented method for deploying a mobile cloud application, the method comprising: receiving, at a server and from a remote client device, a first request to create a frame for the application; storing, by the server, the frame of the application in a repository; generating, by the server, an identifier associated with the frame; initiating, by the server, a copying of the repository to a workspace; and receiving, by the repository or the workspace and from the remote client, a pushing command including the identifier to update the frame stored in the repository or the workspace with application data associated with a created, modified or deleted version of the application.

Aspect 2 according to aspect 1, wherein the workspace is a local workspace associated with the client device, or wherein the workspace is a cloud workspace located in a cloud computing environment associated with the server.

Aspect 3 according to any one of aspects 1 to 2, wherein the repository is a cloud repository located in a cloud computing environment associated with the server.

Aspect 4 according to any one of aspects 1 to 3, wherein the repository is a Git or Gerrit repository.

Aspect 5 according to any one of aspects 1 to 4, wherein the frame is static content of the application, which is configured to be accessed by the client and which is configured to be augmented by application data developed on the client.

Aspect 6 according to any one of aspects 1 to 5, wherein the identifier is a uniform resource locator (URL) that identifies the application and the associated repository.

Aspect 7 according to any one of aspects 1 to 6, wherein the identifier includes a name of the application and an identifier of a location in the associated repository.

Aspect 8 according to any one of aspects 1a, 1b or 3 to 7, the method further comprising: receiving, at the server and from the remote client device, a command to test the created or modified version of the application; accessing, by the server, an on-premise or an on-demand service to retrieve data for testing of the created or modified version of the application under use of the retrieved data; and providing test results to the client device.

Aspect 9 according to aspect 8, wherein the testing of the created or modified version of the application under use of the retrieved data comprises accessing the application data stored in the repository or the workspace.

Aspect 10 according to any one of aspects 1 to 9, the method further comprising: receiving, at the server and from a second client device, a first request to access the application, wherein the first request includes a uniform resource locator; determining, by the server and from the uniform resource locator, the application and the corresponding location in the repository where the updated frame of the application is stored; and providing, by the server and to the second client device, access to the application associated with the updated frame.

Aspect 11 according to any one of aspects 1 to 10, the method further comprising: receiving, at the server and from a third client device, a second request to access the application, wherein the request includes a second uniform resource locator and is received after the first request but before the access to the application associated with the updated frame is provided in response to the first request to access the application; determining, by the server and from the second uniform resource locator, the application and the corresponding location in the repository where the updated frame of the application is stored; providing, by the server and to the third client device, access to the application associated with the updated frame.

Aspect 12 according to any one of aspects 1 to 11, the method further comprising: receiving, at the server and from a second remote client device, a second request to create a second frame for the application, wherein the second request is received after the first request but before the first frame is updated; storing, by the server, the second frame of the application in a repository; generating, by the server, a second identifier associated with the second frame; initiating, by the server, a copying of the repository to the workspace; receiving, by the repository or the workspace and from the second remote client, a pushing command including the second identifier to update the second frame stored in the repository or the workspace with second application data associated with a created, modified or deleted second version of the application.

Aspect 13 according to aspect 12, the method further comprising: receiving, at the server and from the second remote client device, a command to test the created or modified second version of the application; accessing, by the server, an on-premise or an on-demand service to retrieve data for testing of the created or modified second version of the application under use of the retrieved data; and providing test results to the second remote client device.

Aspect 14 according to aspects 13, wherein the testing of the created or modified version of the application under use of the retrieved data comprises accessing the application data stored in the repository or the workspace.

The details of these and other aspects and embodiments of the present disclosure are set forth in the accompanying drawings and the description below. Other features, objects, and advantages of the disclosure will be apparent from the description and drawings, and from the claims.

Reference numbers and designations in the various drawings indicate exemplary aspects, implementations or embodiments of particular features of the present disclosure.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure generally relates to software, computer systems, and computer-implemented methods for providing a lightweight deployment of applications (e.g. mobile cloud applications). Specifically, a centrally managed cloud environment is provided to develop, run and manage multiple applications. Implementations of the present disclosure described herein may provide one or more of the following features:

First, a less time consuming and resource consuming deployment of mobile applications is provided, which allows local developers to easily and rapidly create and publish applications.

Second, multiple mobile applications can be developed, run and managed in parallel by multiple developers or users across local or wide area networks.

Third, the centrally managed cloud environment circumvents the need for local source code management at local client devices of developers. In particular, the local developer is not required to develop the cloud part of the mobile cloud application, which may be provided in a flexible manner by the centrally managed cloud environment. Thus, the local infrastructure needed for the deployment may be reduced to a minimum.

Fourth, the deployment of mobile applications may be scalable with respect to the number of applications managed in parallel and with respect to the number of developers and users accessing applications.

Fifth, the described approach may enhance data security by implementing security aspects in a central manner.

Sixth, the more efficient accessing and prototyping of mobile applications may increase the speed of research and development related to machines or technical processes thereby providing an improved tool for the developer of such machines or processes.

Figure 1:
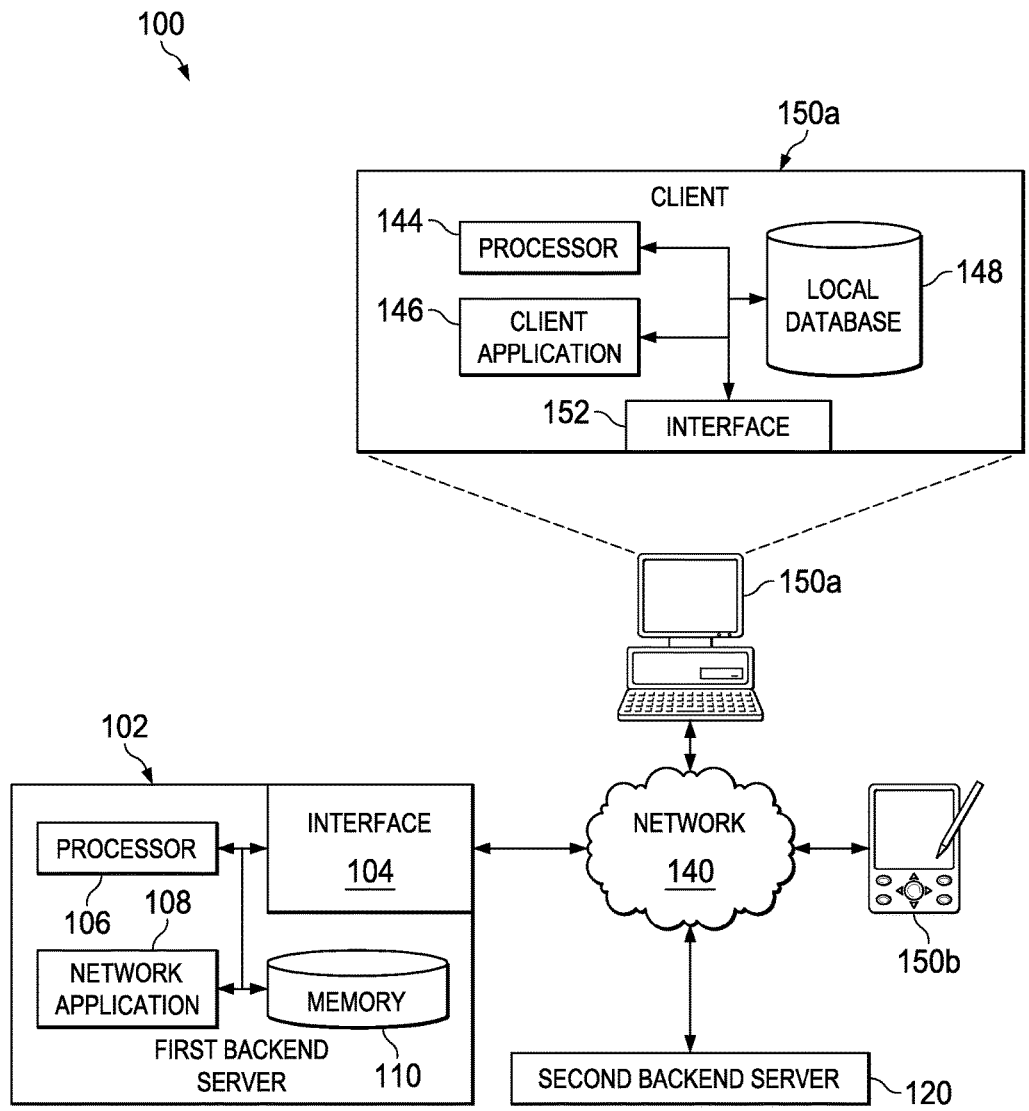
FIG. 1 illustrates an example of a network environment according to an implementation.

FIG. 1 illustrates an example environment 100 according to an implementation for implementing various features of a system for providing a lightweight deployment of mobile applications which are managed in a cloud computing environment. The illustrated environment 100 includes, or is communicably coupled with, a (e.g., front-end) client 150*a-b*, which represents a user or developer installation (e.g., an on-demand or an on-premise installation), and backend server systems 102, 120. In some instances, the front-end client 150*a-b* may co-reside on a single server or system, as appropriate. At least some of the communications between the client 150*a-b* and the backend servers 102, 120 may be performed across or via network 140 (e.g., via a wide area network (WAN) such as the Internet). The server 102, 120 may process data input received from the client devices 150*a*, 150*b* by using the Open Data Protocol (OData), or any other HTTP compatible protocol, like REST, which is a data access protocol. The OData protocol was designed to provide standard create, read, update, and delete access to a data source via a website. OData may be used to access table-like structures similar to the way Structured Query Language (SQL) does, wherein an OData service may correspond to a database schema and an entity may correspond to database table. Customers (e.g., users of client devices 150*a*, 150*b*) may run on-premise systems in hybrid landscapes together with on-demand systems, consuming data from both.

In some implementations, the server 102, 120 can communicate with client device 150*a*, 150*b* using the OData protocol through hypertext transfer protocol (HTTP) or hypertext transfer protocol secure (HTTPS) requests. In some implementations, the server 102, 120 can use a remote function call (RFC) interface to communication with advanced business application programming (ABAP) language and/or non-ABAP programs.

In an aspect, environment 100 depicts an example configuration of a system for establishing business networks using networked applications built on a shared platform in a cloud computing environment, such as environment 100. The client 150a-b and/or the server 102, 120 include development technology and hosted and managed services and applications built on top of the underlying platform technology. In an implementation of the present disclosure described herein, the term "platform technology" is understood as types of Java development platform, such as e.g., Enterprise JAVABEANS (EJB), J2EE Connector Architecture (JCA), JAVA Messaging Service (JMS), JAVA Naming and Directory Interface (JNDI), and JAVA Database Connectivity (JDBC). In an implementation of the present disclosure described herein, the term "platform technology" comprises an SAP BYDESIGN platform, Success Factors Platform, SAP NETWEAVER Application Server JAVA, ERP Suite technology or in-memory database such as High Performance Analytic Appliance (HANA) platform.

The illustrated environment 100 of FIG. 1 includes one or more (e.g., front-end) clients 150a-b. The client 150a-b may be associated with a particular network application or development context, as well as a particular platform-based application system. The client 150a-b may be any computing device operable to connect to or communicate with at least one of the servers 102, 120 using a wireline or wireless connection via the network 140, or another suitable communication means or channel. In some instances, the client 150a-b may be a part of or associated with a business process involving one or more network applications, or alternatively, a remote developer associated with the platform or a related platform-based application.

In general, the client 150a-b includes a processor 144, an interface 152, a client application 146 or application interface, a graphical user interface (GUI), and a memory or local database 148. In general, the client 150a-b includes electronic computer devices operable to receive, transmit, process, and store any appropriate data associated with the environment 100 of FIG. 1. As used in this disclosure, the client 150a-b is intended to encompass a personal computer, laptop, tablet PC, workstation, network computer, kiosk, wireless data port, smart phone, personal data assistant (PDA), one or more processors within these or other devices, or any other suitable processing device. The client or tenant 150a-b may be a mobile communication device with an interface for a connection to network 140. For example, the client 150a-b may comprise a computer that includes an input device, such as a keypad, touch screen, mouse, or other device that can accept user information, and an output device that conveys information associated with the operation of one or more client applications, on-demand platforms, and/or the client 150a-b itself, including digital data, visual information, or GUI.

Both the input and output device may include fixed or removable storage media such as a magnetic storage media, CD-ROM, or other suitable media, to both receive input from and provide output to users of client 150a-b through the display, namely, the GUI. The client application 146 or application interface can enable the client 150a-b to access and interact with applications and modules in backend server systems using a common or similar platform. The client application 146 allows the client 150a-b to request and view content on the client 150a-b. In some implementations, the client application 150a-b can be and/or include a web browser. In some implementations, the client application 146 can use parameters, metadata, and other information received at launch to access a particular set of data from the server 102, 120. Once a particular client application 146 is launched, the client can process a task, event, or other information which may be associated with the server 102, 120. Further, although illustrated as a single client application 146, the client application 146 may be implemented as multiple client applications in the client 150a-b.

There may be any number of clients 150a-b associated with, or external to, environment 100. For example, while illustrated environment 100 includes one client 150a-b, alternative implementations of environment 100 may include multiple clients communicably coupled to the one or more of the systems illustrated. In some instances, one or more clients 150a-b may be associated with administrators of the environment, and may be capable of accessing and interacting with the settings and operations of one or more network applications, and/or other components of the illustrated environment 100. Additionally, there may also be one or more additional clients 150a-b external to the illustrated portion of environment 100 capable of interacting with the environment 100 via the network 140. Further, the terms "client," "customer," and "user" may be used interchangeably as appropriate without departing from the scope of this disclosure. Moreover, while the client 150a-b is described in terms of being used by a single user, this disclosure contemplates that many users may use one computer, or that one user may use multiple computers. In general, clients may usually belong to one customer or company. Several employees of the customer, called users, can use the applications deployed on the corresponding client. For instance, the term "client" refers to a system providing a set of client applications belonging to or rented by a particular customer or business entity. Several employees of that particular customer or business entity can be users of that client and use the network applications provided by or available on this client.

The data stored in the local database 148 may be locked and accessed by the first backend server 102, and interacted with the front-end client 150a-b. In other instances, the data may be used by a network application 108 associated with one of the other backend servers 120 for processing applications associated with those systems. For example, one or more of the components illustrated within the backend servers 102, 120 may be located in multiple or different servers, cloud-based or cloud computing networks, or other locations accessible to the backend servers 102, 120 (e.g., either directly or indirectly via network 140). For example, each backend server 102, 120 and/or client 150a-b may be a JAVA 2 Platform, Enterprise Edition (J2EE)-compliant application server that includes technologies such as Enterprise JAVABEANS (EJB), J2EE Connector Architecture (JCA), JAVA Messaging Service (JMS), JAVA Naming and Directory Interface (JNDI), and JAVA Database Connectivity (JDBC). In some instances, each of the backend servers 102, 120 may store a plurality of various applications, while in other instances, the backend servers 102, 120 may be dedicated servers meant to store and execute certain network applications built based on the on-demand platform using the on-demand platform technology and on-demand platform business content. In some instances, the backend servers 102, 120 may include a web server or be communicably coupled with a web server, where one or more of the network applications 108 associated with the backend servers 102, 120 represent web-based (or web-accessible) applications accessed and executed through requests and interactions received on the front-end client 150a-b operable to interact with the programmed tasks or operations of the corresponding on-demand platform and/or network applications.

At a high level, the backend servers 102, 120 include an electronic computing device operable to receive, transmit, process, store, or manage data and information associated with the environment 100. The backend servers 102, 120 illustrated in FIG. 1 can be responsible for receiving requests from one or more clients 150a-b (as well as any other entity or system interacting with the backend servers 102, 120, including desktop or mobile client systems), responding to the received requests by processing said requests in an on-demand platform and/or an associated network application, and sending the appropriate responses from the appropriate component back to the requesting front-end client 150a-b or other requesting system. Components of the backend servers 102, 120 can also process and respond to local requests from a user locally accessing the backend servers 102, 120. Accordingly, in addition to requests from the front-end client 150a-b illustrated in FIG. 1, requests associated with a particular component may also be sent from internal users, external or third-party customers, and other associated network applications, business processes, as well as any other appropriate entities, individuals, systems, or computers. In some instances, either or both an on-demand platform and/or a network application may be web-based applications executing functionality associated with a networked or cloud-based business process.

As used in the present disclosure, the term "computer" is intended to encompass any suitable processing device. For example, although FIG. 1 illustrates three backend servers 102, 120, environment 100 can be implemented using any number of servers, as well as computers other than servers, including a server pool. Indeed, the backend servers 102, 120 and/or the clients 150a-b may be any computer or processing device such as, for example, a blade server, general-purpose personal computer (PC), Macintosh®, workstation, UNIX-based workstation, or any other suitable device. In other words, the present disclosure contemplates computers other than general purpose computers, as well as computers without conventional operating systems. Further, the illustrated backend servers 102, 120 may be adapted to execute any operating system, including LINUX, UNIX, WINDOWS, MAC OS, or any other suitable operating system.

The first backend server 102 is illustrated in details in FIG. 1. The first backend server 102 includes an interface 104, a processor 106, a memory 110, a network application 108, and other components further illustrated in FIG. 2. In some instances, the backend servers 102, 120 and its illustrated components may be separated into multiple components executing at different servers and/or systems. For example, while FIG. 1 illustrates the network application 108 and the processor 106 as separate components, other example implementations can include the processor 106 within a separate system, as well as within as part of the network application's inherent functionality. Thus, while illustrated as a single component in the example environment 100 of FIG. 1, alternative implementations may illustrate the backend servers 102, 120 as comprising multiple parts or portions accordingly.

In FIG. 1, the interface 104 is used by the first backend server 102 to communicate with other systems in a client-server or other distributed environment (including within environment 100) connected to the network 140 (e.g., one of the front-end clients 150a-b, as well as other clients or backend servers communicably coupled to the network 140). The term "interface" 104, 152 generally includes logic encoded software and/or hardware in a suitable combination and operable to communicate with the network 140. More specifically, the interface 104 may comprise software supporting one or more communication protocols associated with communications such that the network 140 or the interface's hardware is operable to communicate physical signals within and outside of the illustrated environment 100. Generally, the backend servers 102, 120 may be communicably coupled with a network 140 that facilitates wireless or wireline communications between the components of the environment 100 (e.g., among the backend servers 102, 120 and/or one or more front-end clients 150a-b), as well as with any other local or remote computer, such as additional clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the components associated with the backend servers 102, 120 may be included within the network 140 as one or more cloud-based services or operations.

The term "network" refers to all or a portion of an enterprise or secured network, while in another instance, at least a portion of the network 140 may represent a connection to the Internet. In some instances, a portion of the network 140 may be a virtual private network (VPN). Further, all or a portion of the network 140 can include either a wireline or wireless link. Example wireless links may include 802.11a/b/g/n, 802.20, WiMax®, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Java Debug Wire Protocol (JDWP), Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the first backend server 102 includes a processor 106. Although illustrated as a single processor 106 in the backend server 102, two or more processors may be used in the backend server 102 according to particular needs, desires, or particular embodiments of environment 100. The backend servers 120 and 102, as well as other backend systems, may similarly include one or more processors. The term "processor" refers to a central processing unit (CPU), a blade, an application specific integrated circuit (ASIC), a field-programmable gate array (FPGA), or another suitable component. Generally, the processor 106 executes instructions and manipulates data to perform the operations of the backend server 102, and, specifically, the functionality associated with the corresponding network application 108. In one implementation, the server's processor 106 executes the functionality required to receive and respond to requests and instructions from the front-end client 150a-b, as well as the functionality required to perform the operations of the associated network application 108 and an on-demand platform, among others.

At a high level, the term "software application", "mobile application", "network application" and "cloud application" described in this specification may refer to any application, program, module, process, or other software that may execute, change, delete, generate, or otherwise manage information associated with the server 102, 120, a third party system, or the client device 150a-b, and in some cases, a business process performing and executing business process-related events. In particular, business processes communicate with other users, applications, systems, and components to send, receive, and process events. In some instances, a particular network application 108 may operate in response to and in connection with one or more requests received from an associated client or other remote client. Additionally, a particular network application 108 may operate in response to and in connection with one or more requests received from other network applications external to the backend server 102. In some instances, the network application 108 can be a networked application, for example, the network application 108 is built on a common platform with one or more applications in either or both of the backend servers 120 and 102. In some instances, the network application 108 may request additional processing or information from an external system or application. In some instances, each network application 108 may represent a web-based application accessed and executed by the front-end client 150a-b via the network 140 (e.g., through the Internet, or via one or more cloud-based services associated with the network application 108).

Further, while illustrated as internal to the backend server 102, one or more processes associated with a particular network application 108 may be stored, referenced, or executed remotely. For example, a portion of a particular network application 108 may be a web service that is remotely called, while another portion of the network application 108 may be an interface object or agent bundled for processing at a remote system. Moreover, any or all of a particular network application 108 may be a child or sub-module of another software module or enterprise application (e.g., the backend servers 120 and 130). Still further, portions of the particular network application 108 may be executed or accessed by a user working directly at the backend servers 102, as well as remotely at corresponding front-end client 150a-b.

Regardless of the particular implementation, "software" may include computer-readable instructions (e.g., programming code), firmware, wired or programmed hardware, or any combination thereof on a tangible and non-transitory medium operable when executed to perform at least the processes and operations described herein. Indeed, each software component may be fully or partially written or described in any appropriate computer language including C, C++, JAVA, VISUAL BASIC, assembler, PERL, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, the processor 106 executes the corresponding network application 108 stored on the associated backend servers 120. In some instances, a particular backend server may be associated with the execution of two or more network applications (and other related components), as well as one or more distributed applications executing across two or more servers executing the functionality associated with the backend servers.

FIG. 1 further includes memory 110 in the backend server 102. For example, the backend server 102 can host a master application for a particular data object, which is stored at the memory 110. The data object stored at the memory 110 may be accessed by other networked applications, for example, by applications of the backend servers 120 and 102. The data access does not require data replication and therefore can be stored at a single location (e.g., the memory 110). In addition, the memory 110 of the backend server 120 stores data and program instructions for the network application 108. The term "memory" refers to any memory or database module and may take the form of volatile or non-volatile memory including, without limitation, magnetic media, optical media, random access memory (RAM), read-only memory (ROM), removable media, or any other suitable local or remote memory component.

The memory 110 may store various business objects, object models, and data, including classes, frameworks, applications, backup data, business objects, jobs, web pages, web page templates, database tables, process contexts, repositories storing services local to the backend server 120 and any other appropriate information including any parameters, variables, algorithms, instructions, rules, constraints, or references thereto associated with the purposes of the backend server 120 and its functionality. In an aspect, the term "business object" is a representation of an intelligible business or non-business entity, such as an account, an order, employee, an invoice or a financial report. In some implementations, including in a cloud-based system, some or all of the memory 110 may be stored remote from the backend server 120 and communicably coupled to the backend server 120 for usage. As described above, memory 110 can include one or more meta-models associated with various objects included in or associated with the underlying platform. Specifically, memory 110 can store items and entities related to the network application 108 and/or other collaboration-related entities or components. Some or all of the elements illustrated within memory 110 may be stored external to the memory 110. These items may be made accessible within the network environment as illustrated in FIG. 2.

Figure 2A:
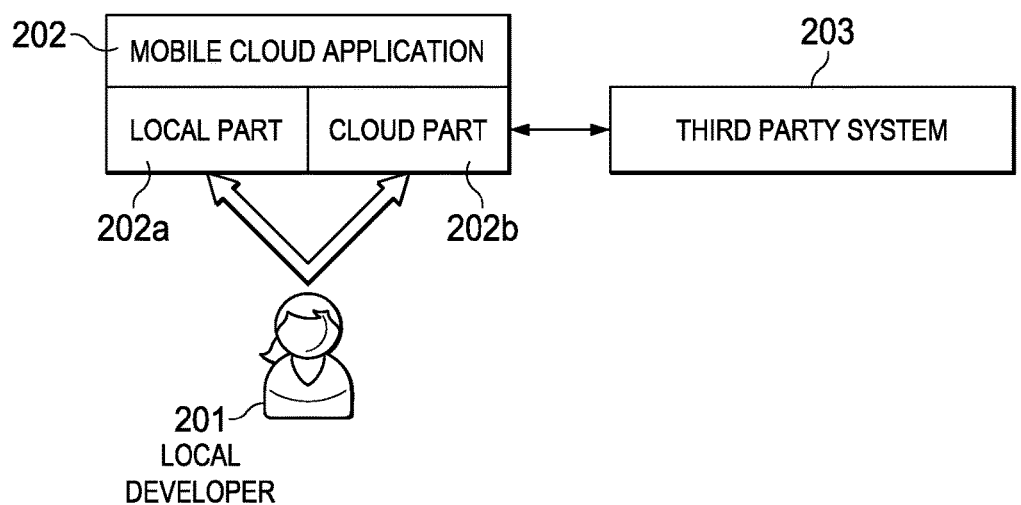
FIG. 2A illustrates development of mobile cloud applications according to a conventional approach of the prior art.

FIG. 2A illustrates development of mobile cloud applications (e.g., Java or HTML5 applications) according to a conventional approach of the prior art. A local developer 201 (e.g., an engineer in a company, who wants to develop an application especially adapted for the technical process flow within the company or with respect to partners of the company) develops a mobile cloud application 202 by developing the local part 202a, which defines operations of the application 202 operated in the local web client (e.g. browser), as well as the cloud part 202b of the application 202, which defines operations of the application 202 operated by the cloud system 102 that is remote from the local client 105a, 150b of the developer 201. In an aspect, the cloud part 202b may ensure reliable communication with third party systems 203, 120, that are communicatively connected with the cloud system 102 within the network 140. The third party system may be a computing device, such as a backend server 120 or a mobile communication device. The cloud part of the application 202 may be especially adapted to the communication between the third party system 203, 120 and the cloud system 102.

For example, the problem with this prior art approach may be, that the local developer 201 may need substantial resources to develop the application 202, as the developer 201 may also need to develop the cloud part 202b of the application 202. In this context, the developer may have to anticipate specifics of the communication between the cloud system 102 and the third party system 120, 203 and can only develop one application 202 at a time, as the cloud part 202b is blocked for development in connection with the local part 202a of the application 202. In an aspect, this prior art approach may require local source code management and a build and deployment process for the cloud part 202b of the application 202. In this context, a virtual machine managed by the user or developer may be required. Also, the version management of the developed applications may be manual in the prior art approach.

Lightweight HTML5 applications are a new type of web applications that may be heavily using client-side JavaScript in the presentation layer and communicate with backend services using AJAX requests. A prominent example of HTML5 applications are the FIORI applications, which are user interface extensions based on backend services from either on-premise or on-demand applications. These applications may have to be customized and modified to tailor them according to the needs of the customers. To a large extent, these modifications can be done in the static content (HTML, CSS, or JAQVASCRIPT) of the application. Traditionally, it may be required to have dedicated servers or virtual machines (VMs) for every customer specific modification of an application. This may be quite expensive as it comes with high costs for hosting and administration of the servers.

Figure 2B:
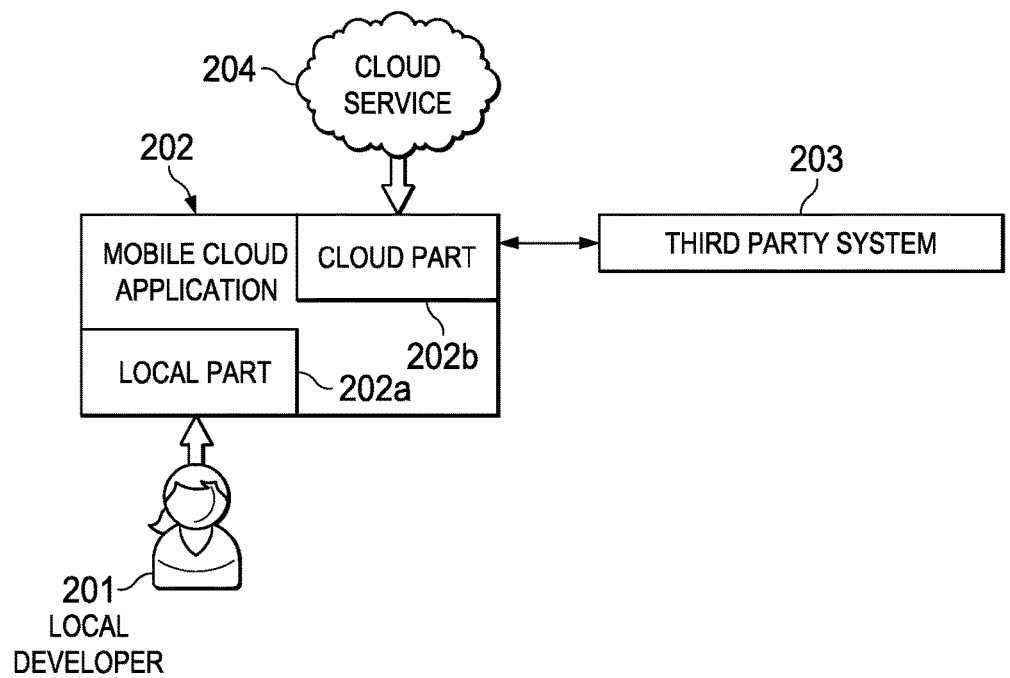
FIG. 2B illustrates development of mobile cloud applications according to an implementation of the present application.

FIG. 2B illustrates development of mobile cloud applications (e.g., Java or HTML5 applications) according to an implementation of the present application. A local developer 201 (e.g., an engineer in a company, who wants to develop an application especially adapted for the technical process flow within the company or with respect to partners of the company) develops a mobile cloud application 202 by only developing the local part 202a, which defines operations of the application 202 operated in the local web client (e.g. browser), and not developing the cloud part 202b of the application 202, which defines operations of the application 202 operated by the cloud system 102 that is remote from the local client 105a, 150b of the developer 201. In an aspect, a cloud service 204 operated by the cloud system 102 may provide the cloud part 202b, which may ensure reliable communication with third party systems 203, 120. The third party system 203 may be a computing device, such as a backend server 120 or a mobile communication device. The cloud part 202b of the application 202 may be provided in a flexible manner, so that it can be used for arbitrary mobile cloud applications 202. The cloud part 202b may be especially adapted to the communication between the third party system 203, 120 and the cloud system 102, or may be programmed in a generic manner to be flexibly used with arbitrary third party systems 203.

Among the above mentioned advantages, the approach illustrated in FIG. 2B may allow that source code is stored in a cloud repository (e.g. memory 110 in FIG. 1) and can be developed in the cloud system 102. For example, the build and deployment processes can be served from the cloud system 102 to the client 150a, 150b of the local developer 201. In an aspect, the mobile cloud applications 202 may be served via the central cloud service 204 on the cloud system 102 (e.g. an in-memory database and/or multiple server platform with parallel-processing), which may be managed by a central entity. In an aspect, an integrated version management of the mobile cloud applications 202 may be provided by the cloud service 204 that allows for developing and testing multiple mobile cloud applications 202 in parallel.

Figure 3:
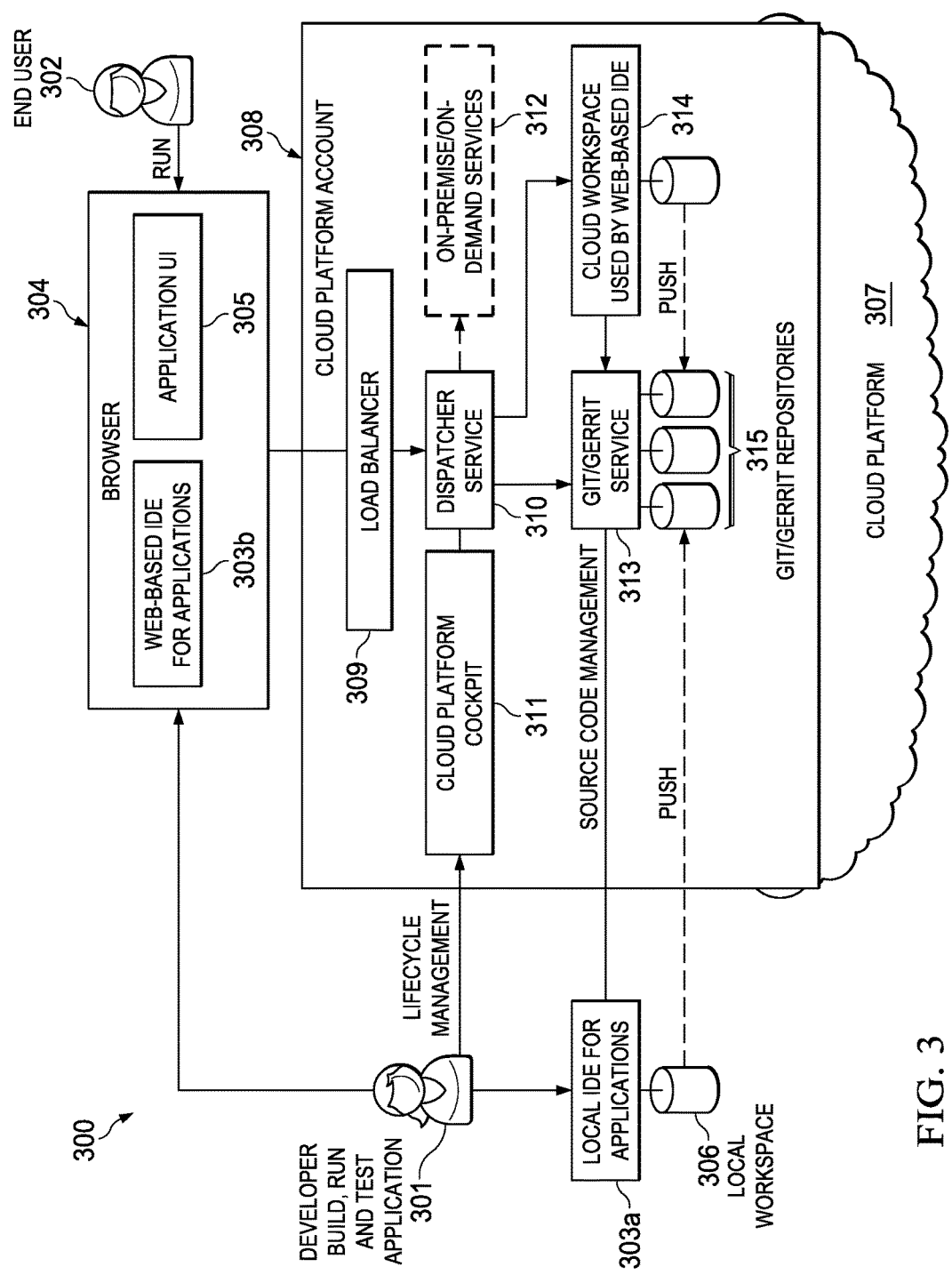
FIG. 3 illustrates an exemplary system for implementation of the approach of mobile cloud application deployment illustrated in FIG. 2B.

FIG. 3 illustrates an exemplary system 300 for implementation of the approach of mobile application deployment illustrated in FIG. 2B. The system 300 may comprise a client 150a, 150b as shown in FIG. 1 that is operated by a developer 301 or a user 302. The client 150a, 150b that is accessible to the developer 301 for building, running and testing the mobile cloud application 202 may execute an integrated development environment (IDE; like Eclipse, jdb, NetBeans, SharpDevelop, Lazarusor, and the like), which may be a local IDE 303a or a web-based IDE 303b. The client device 150a, 150b operated by the developer 301 may include a browser 304, which hosts the web-based IDE and an application user interface (UI) 305. The user 302 that runs the mobile cloud application 202 may operate a client device 150a, 150b that executes the browser 304 and the application UI 305.

In an aspect, the system 300 may further comprise a cloud system or platform 307, which hosts and operates a cloud platform account 308 including one or more of: a load balancer 309, a cloud platform cockpit 311, a dispatcher service 310, an on-premise or on-demand service 312, a Git or Gerrit Service 313, a cloud workspace 314 and one or more Git or Gerrit repositories. The client devices 150a, 150b operated by the developer 301 and/or the user 302 may be communicatively connected to the cloud platform 307 via network 140. For example, the cloud platform may be implemented by one or more backend servers 102, 120 as illustrated in FIG. 1. The cloud platform 307 may be a HANA platform. The mobile cloud application 202 may a HTML5 application.

In an aspect, there may be different user groups that interact with the mobile cloud application and the dispatcher service 310 in different ways: End users 302 productively use running applications, developers 301 create or modify the applications, and operators manage the lifecycle of applications. End users 302 may use a different user store (identity provider) whereas developers 301 and operators may use the same user store. In order to develop or modify an application, a developer 301 may need to have an account 308 for the cloud platform 307. In an aspect, every application may be associated with exactly one account 308 of a developer 301 or user 302. The developers 301 may need to be registered in the user store and member of the account 308 the application is associated with. A developer 301 can be member of multiple cloud platform accounts 308. An application may be provided to end-users 302 of another account with a subscription in the consuming account. In the consuming account, it may only be consumed (e.g. run and/or viewed), but not further developed.

In an aspect, the dispatcher service 310 may be a Java web application with several purposes. It may a web dispatcher for the mobile cloud applications (e.g., HTML5 applications) that serves static content of applications from file systems (e.g., also directly from a repository like GIT, Orion Workspace or a Document store) and forwards requests to backend systems configured via destinations. In an aspect, the static content served by the dispatcher service 310 may be a portion of the cloud part 202b of the mobile cloud application 202 in FIGS. 2A, 2C (but without the local part 202a of the application 202) and may be included in a frame of the application, wherein the static content or the frame may be augmented by the local part 202a of the application 202, the latter may be developed and added by the local developer 201, 301. The term "frame" of the application may be understood as the application 202 with the cloud part 202b but without the local part 202a of the application 202. Basically the fame may be a generic application that can be served by the cloud to the local developer so that the developer does not need to develop the cloud part 202b, wherein the cloud part 202b ensures communication with third party systems or backends. For example, communication capabilities are provided by central services in the cloud infrastructure (cloud platform) which indeed would act as the frame. The dispatcher may use these capabilities to dispatch calls to the third party systems or backends. The dispatcher service 310 may be an orchestrator of the applications providing lifecycle operations, development operations and also subscription operations. The dispatcher service 310 may be a singleton instance that is shared by all applications and managed by a central entity. It may allow to run multiple instances of the dispatcher service 310 (e.g. in parallel processing) in order to allow more requests to be served simultaneously and to provide service from all locations within a LAN or WAN.

In an aspect, mobile cloud applications can be created and managed from the cloud platform cockpit 311 with an integrated version management and integration system. The Git Service 313 may allow to test development versions of the applications. Though, only one version is the active one that is published to the user 302 if that application are developed in a Git repository provided by the cloud platform Git service 313. From there the applications can directly be published without additional packaging and deployment operations by the user 302 or developer 301. The primary data store for the mobile cloud applications may be the one or more Git repositories 315. The file system of the dispatcher service 310 may be a secondary store for caching purposes. Its content can be recovered, therefore a backup of the file system may not be necessary. However, for performance reasons it may use a persistent file system so that the content may survive a restart of the dispatcher service 310.

In an aspect, the static content of the applications may be stored and versioned in the one or more Git repositories 315 which are managed by the Git Service 313. "Git" as used herein may be a distributed revision control and source code management (SCM) system with an emphasis on speed, data integrity, and support for distributed, non-linear workflows. As with most other distributed revision control systems, and unlike most client-server systems, every Git working directory is a full-fledged repository with complete history and full version tracking capabilities, independent of network access or a central server. Git may contain several data structures, e.g., a mutable index (also called stage or cache) that caches information about the working directory and the next revision to be committed; and an immutable, append-only object database. The object database may contain four types of objects: A blob (binary large object) is the content of a file. Blobs have no file name, time stamps, or other metadata. A tree object is the equivalent of a directory. It may contain a list of file names, each with some type bits and the name of a blob or tree object that is that file, symbolic link, or directory's contents. This object describes a snapshot of the source tree. A commit object links tree objects together into a history. It may contain the name of a tree object (of the top-level source directory), a time stamp, a log message, and the names of zero or more parent commit objects. A tag object is a container that contains reference to another object and can hold additional metadata related to another object. It may be used to store a digital signature of a commit object corresponding to a particular release of the data being tracked by Git. The index may serve as connection point between the object database and the working tree. Each object may be identified by a hash of its contents. Git computes the hash, and uses this value for the object's name. The object may be put into a directory matching the first two characters of its hash. The rest of the hash may be used as the file name for that object. In an aspect, Git may stores each revision of a file as a unique blob. The relationships between the blobs can be found through examining the tree and commit objects. Newly added objects may be stored in their entirety using compression. This can consume a large amount of disk space quickly, so objects can be combined into packs, which use delta compression to save space, storing blobs as their changes relative to other blobs.

For offline editing, developers 301 can (e.g., directly) interact with the Git Service 313 from their local client 150a, 150b via the local IDE 303a of their choice. Alternatively, developers 301 may use the web-based IDE 303b, to develop the application online (e.g., while being connected with the cloud platform 307 via a network such as the Internet). As server-side backend, the web-based IDE 303b may use the cloud workspace (e.g. Orion server) 314. To edit data in the one or more Git repositories 315, the data may be copied to the cloud workspace 314 and the edited data may be pushed back to the Git repositories 315. In case of the offline development of the application by the developer 301 via the local IDE 303a (e.g., Eclipse), the associated local workspace 306 may be located on the local memory 110 of the client device 150a, 150b used by the developer 301. In case of the online development of the application with the web-based IDE 303b, the cloud workspace 314 may be used as the respective workspace. The Git UI of the cloud workspace 314 may be exposed to the developer 301 to allow for interaction with the Git Service 313. In other words, the pair of local IDE/local workspace 306 may be used for offline deployment of the mobile cloud application 202 by the developer 310, whereas the pair web-based IDE/cloud workspace 314 may be used for online (e.g., via the Internet) deployment of the mobile cloud application 202 by the developer 310.

In an aspect, Git projects may be created by the dispatcher service 310 when a new application is created. The dispatcher service 310 then exposes the repository URL to the developer 301. Some actions performed in the Git Service 313 may require special privileges. An example is the creation of a new Git repository (Gerrit project) for an application by the dispatcher service 310. To enable this, a privileged technical user can be used in service to service communication. This user may exist in the Gerrit user store only but does not exist in the cloud user store. In an aspect, a platform operator that has the required privileges to administrate the Gerrit server may be assigned. This user may be contained in the HANA Cloud user store. Gerrit may expose a security role administrator. Any user can be made a Gerrit administrator by assignment to this security role. Gerrit is a web-based team software code review tool. Software developers in a team can review each other's modifications on their source code using a Web browser and approve or reject those changes. It integrates closely with Git, a distributed version control system.

In an aspect, the optional on-premise or on-demand services 312 may provide data of other (e.g. third party) backend systems upon request. In an aspect, the on-premise or on-demand services 312 may be associated with the third party system 203 in FIG. 1C. In certain implementations, the on-demand or on-demand services 312 can be a fully integrated enterprise resource planning (ERP) system, an OLTP (OnLine Transaction Processing) systems or an OLAP (OnLine Analytical Processing) system that may be used to carry out business or technical processes of a company where employees and other stakeholders, such as suppliers or customers, follow a process which may result in documents created and/or analyzed in a database of the respective system. The on-demand products can be a complete software-as-a-service (SaaS) system in which software and its associated data are hosted centrally (for example, in the cloud-computing environment), and are accessed by users using the client (e.g., the web browser) over the Internet.

Offline Application Development Workflow

In an exemplary implementation, a development workflow is initiated from the cloud platform cockpit 311, which provides access to the operations for mobile cloud application. The workflow may include one or more of the following operations:

1. A new application is created. This may also trigger the creation of the corresponding Git repository 315 in the Git Service 313. The developer 301 may use a Git client to clone the application from the Git Service 313, modifies the application and commits changes to the local Git repository 315. Eventually, the developer may push the changes to the Git Service 313.
2. After configuring the required backend destinations, the developer 301 may test the developed version of the application by navigating to an identifier (e.g., URL) provided in the cloud platform cockpit 311.
3. A new version of the application is created in the cloud platform cockpit 311. Alternatively, a tag may be created locally on the client 150a, 150b and pushed to the Git Service 313.
4. The created or updated version of the application can be activated in the cloud platform cockpit 311, so that it can be served to the end users 302 for access.
5. The application may be (re-)started so that the updated version becomes publicly available under the application's identifier (e.g. URL).

Figure 4:
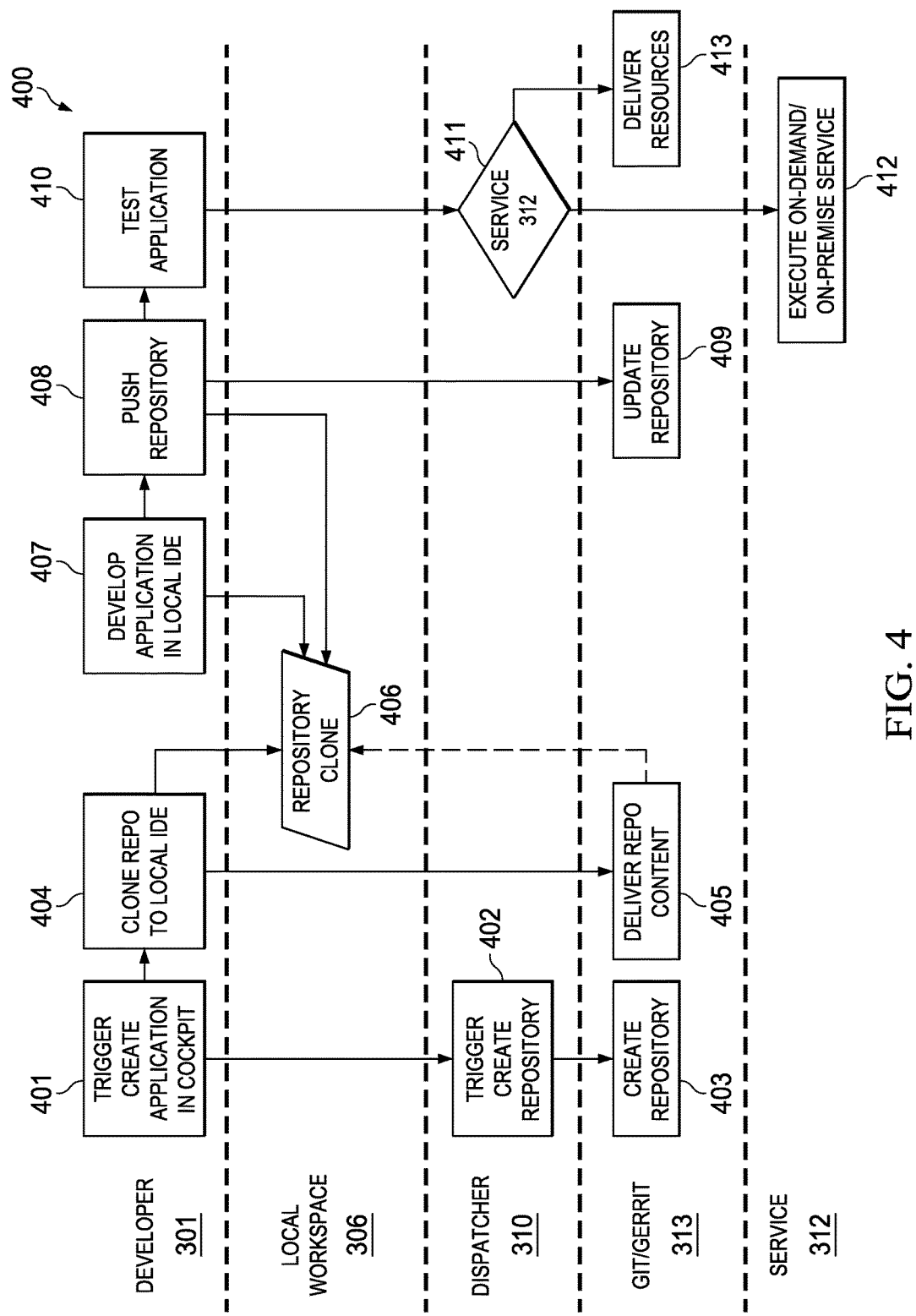
FIG. 4 illustrates an exemplary offline application development workflow according to an implementation.

FIG. 4 illustrates an exemplary offline application development workflow 400 according to an implementation. For clarity of presentation, the description that follows generally describes workflow 400 in the context of at least FIGS. 1, 2A-2B, and 3. However, it will be understood that workflow 400 may be performed, for example, by any other suitable system, environment, software, and hardware, or a combination of systems, environments, software, and hardware as appropriate. In some implementations, various steps of workflow 400 can be run in parallel, in combination, in loops, and/or in any order.

At 401, the developer 301 triggers the creation of a new application in the cloud platform cockpit 311. From 401, workflow 400 proceeds to 402 and 404.

At 402, the dispatcher 310 is initiated by the cockpit 311 to trigger the creation of one or more repositories 315. From 402, workflow 400 proceeds to 403.

At 403, the dispatcher 310 initiates the Git or Gerrit service 313 to create the repositories 315.

At 404, a copy of the repository 315 is received or generated at the client device 150a, 150b of the developer 301 and the copy is stored in the local workspace 306 at 406. From 404, workflow 400 also proceeds to 405. At 405, repository content may be exchanged between client and Git service 313. For example, static content may be served from the Git repository 315

At 407 (which can be an independent step independent, where the developer can develop the application at any time but before getting it into any sort of repository it may need to be created and cloned first) the developer 301 develops (e.g., create, modify or delete) a portion of the application in the local IDE 303a by using the stored copy of the repository to store the developed portion of the application at 406. From 407, workflow 400 proceeds to 408.

At 408, the developer initiates a command to push the developed application towards the repository 315, where the developed application is stored at 409. From 408, workflow 400 optional proceeds to 410.

At optional operation 410, the developer may test the application by initiating on-premise or on-demand service 312 via dispatcher 310 at 411. At 411, the dispatcher may make application data stored in the repository 315 accessible to the service 312 via the Git service 313. At 412, the service 312 may execute the developed application by using data retrieved from the repository 315 via the Git service 313 at 413, and by using the application data associated with the developed application as retrieved from the repository 315. The test results may be provided to the developer 301, who then can further adjust the developed application or can approve the developed application for access by end users 302.

Online Application Development Workflow

Figure 5:
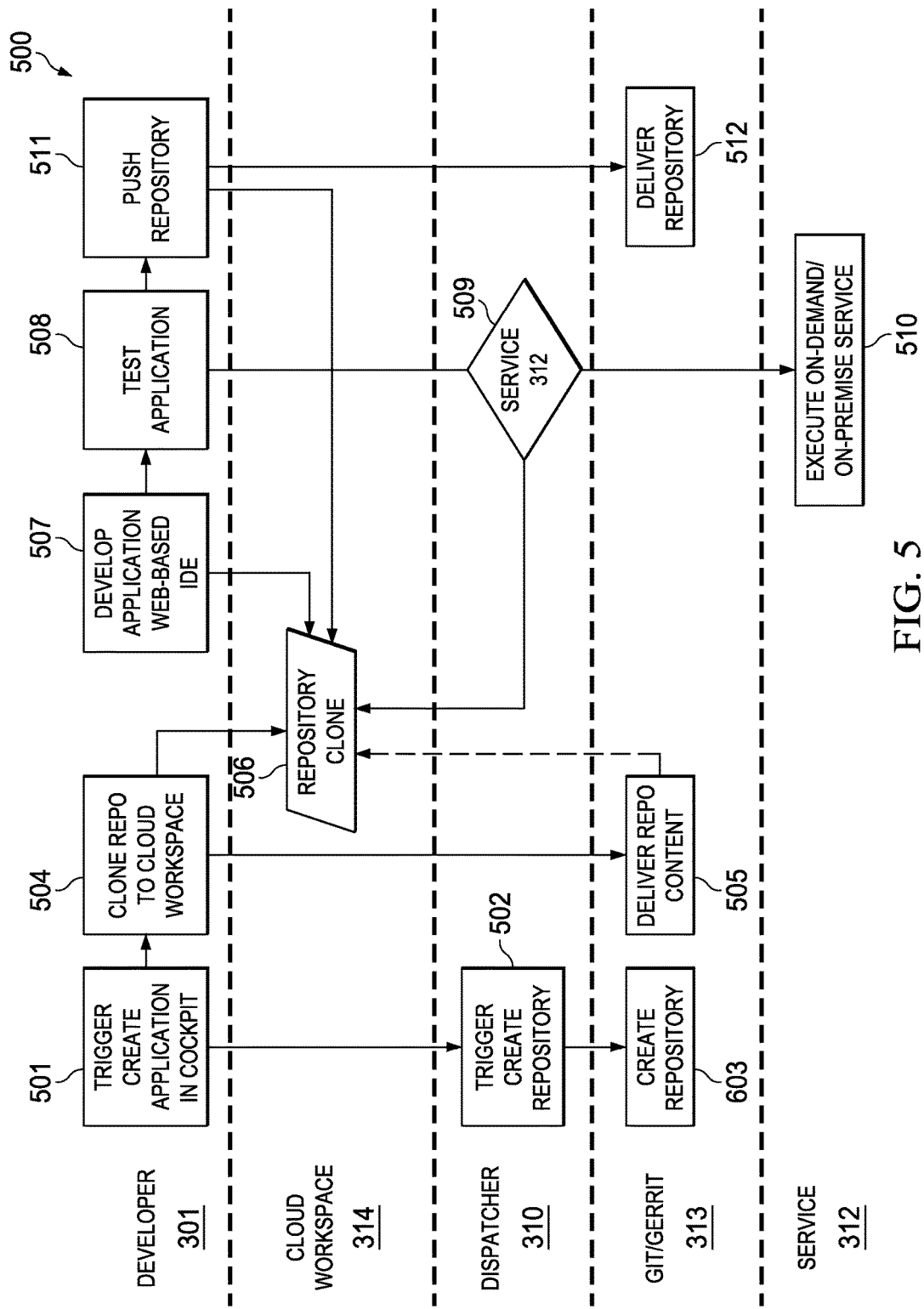
FIG. 5 illustrates an exemplary online application development workflow according to an implementation.

FIG. 5 illustrates an exemplary online development workflow 500 according to an implementation. For clarity of presentation, the description that follows generally describes workflow 500 in the context of at least FIGS. 1, 2A-2B, 3, and 4. However, it will be understood that workflow 500 may be performed, for example, by any other suitable system, environment, software, and hardware, or a combination of systems, environments, software, and hardware as appropriate. In some implementations, various steps of workflow 500 can be run in parallel, in combination, in loops, and/or in any order.

At 501, the developer 301 triggers the creation of a new application in the cloud platform cockpit 311. From 501, workflow 500 proceeds to 502.

At 502, the dispatcher 310 is initiated by the cockpit 311 to trigger the creation of one or more repositories 315. From 502, workflow 500 proceeds to 503.

At 503, the dispatcher 310 initiates the Git or Gerrit service 313 to create the repositories 315. From 503, workflow 500 proceeds to 504.

At 504, a copy of the repository 315 is stored in the cloud workspace 314 at 506. From 504, workflow 500 proceeds to 505. At 505, repository content may be exchanged between client and Git service 313. For example, static content may be served from the Git repository 315. From 505 or 504, workflow 500 proceeds to 507.

At 507, the developer 301 develops (e.g., create, modify or delete) a portion of the application in the web-based IDE 303b by using the stored copy of the repository to store the developed portion of the application. From 507, workflow 500 proceeds to 511 or to optional operation at 508.

At 511, the developer initiates a command to push the developed application towards the repository 315. From 511, workflow 500 proceeds to 512. At 512, the developed application is stored via the Git service 313 at 512. After 512, the developer can optionally iterate again from 507 to refine his application (e.g., fix errors or add functionality to the application) which may still exists in 506.

At optional operation 508, the developer may test the application by initiating an on-premise or on-demand service 312 via dispatcher 310 at 509. At 509, the dispatcher 310 may make application data stored in the cloud workspace 314 accessible to the service 312. From 509, workflow 500 proceeds to 510. At 510, the service 312 may execute the developed application by using data provided by the service 312 and by using the application data associated with the developed application as retrieved from the cloud workspace 314. The test results may be provided to the developer 301, who then can further adjust the developed application or can approve the developed application for access by end users 302. After 510, the developer can optionally iterate again from 507 to refine his application (e.g., fix errors or add functionality to the application) which may still exists in 506.

In an aspect, if the web-based IDE 303b is used to develop the application, the workflow may be analogous to the offline development workflow. However, FIG. 5 indicates that the online workflow may have the advantage that in order to test an application it is not required to create a Git commit and push it to the Git Service 313 or repository 315. Instead, the application can be tested directly from the cloud workspace 314. While in case of the offline development workflow, the workspace is the local workspace 306, the workspace in case of the online development workflow is the cloud workspace 314, whereas each workspace is in communication with the respective local 303a or web-based 303b IDE. In course of the testing of the application, on-premise or on-demand services 312 may be used to test the application on actual data, e.g. from ERP, OLTP or OLAP databases.

In an aspect of process 400 or 500, the process may further comprise: receiving, at a server and from a remote client device, a first request to create a frame for the application; storing, by the server, the frame of the application in a repository; generating, by the server, an identifier associated with the frame and the repository; initiating, by the server, a copying of the repository to a workspace; and receiving, by the repository or the workspace and from the remote client, a pushing command including the identifier to update the frame stored in the repository or the workspace with application data associated with a created, modified or deleted version of the application. In an aspect, the workspace is a local workspace associated with the client device, or wherein the workspace is a cloud workspace located in a cloud computing environment associated with the server. In an aspect of process 400 or 500, the process may further comprise: receiving, at the server and from the remote client device, a command to test the created or modified version of the application; accessing, by the server, an on-premise or an on-demand service to retrieve data for testing of the created or modified version of the application under use of the retrieved data; and providing test results to the client device, wherein the testing of the created or modified version of the application under use of the retrieved data comprises accessing the application data stored in the repository or the workspace.

In an aspect of process 400 or 500, the process may further comprise: receiving, at the server and from a second remote client device, a second request to create a second frame for the application, wherein the second request is received after the first request but before the first frame is updated; storing, by the server, the second frame of the application in a repository; generating, by the server, a second identifier associated with the second frame and the repository; initiating, by the server, a copying of the repository to the workspace; receiving, by the repository or the workspace and from the second remote client, a pushing command including the second identifier to update the second frame stored in the repository or the workspace with second application data associated with a created, modified or deleted second version of the application. In an aspect of process 400 or 500, the process may further comprise: receiving, at the server and from the second remote client device, a command to test the created or modified second version of the application; accessing, by the server, an on-premise or an on-demand service to retrieve data for testing of the created or modified second version of the application under use of the retrieved data; and providing test results to the second remote client device, wherein the testing of the created or modified version of the application under use of the retrieved data comprises accessing the application data stored in the repository or the workspace.

Accessing Applications

Figure 6:
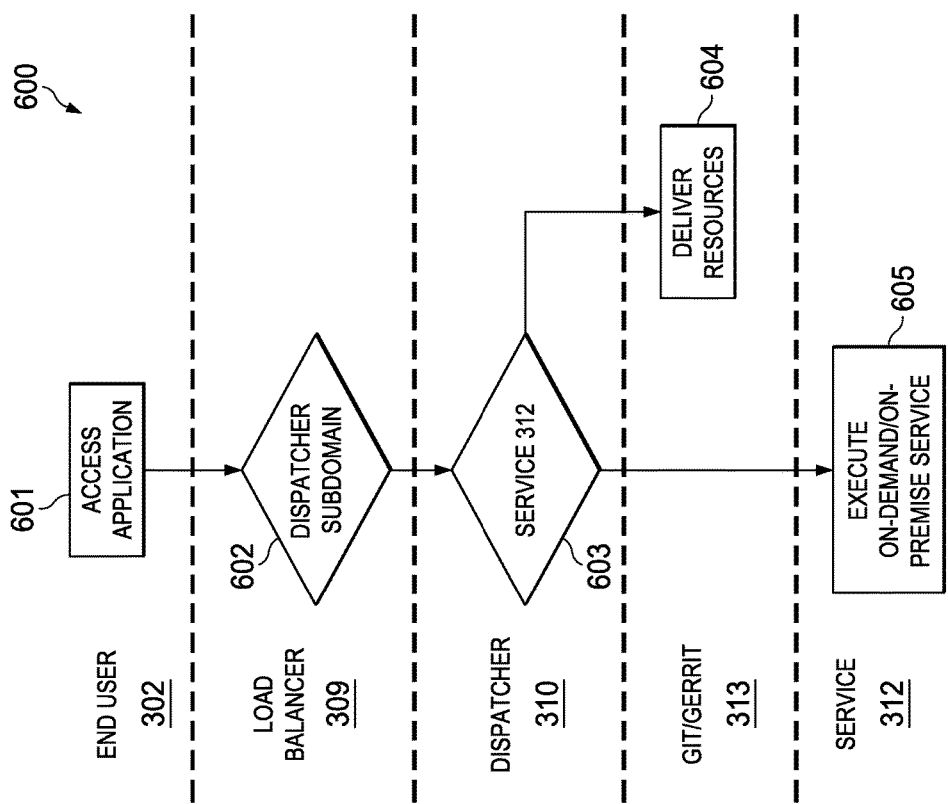
FIG. 6 illustrates an exemplary process flow for accessing the application by the end user according to an implementation.

FIG. 6 illustrates an exemplary process flow 600 for accessing the application by end user 302 according to an implementation. For clarity of presentation, the description that follows generally describes process flow 600 in the context of at least FIGS. 1, 2A-2B, and 3-5. However, it will be understood that process flow 600 may be performed, for example, by any other suitable system, environment, software, and hardware, or a combination of systems, environments, software, and hardware as appropriate. In some implementations, various steps of process flow 600 can be run in parallel, in combination, in loops, and/or in any order.

At 601, the end user 302 transmits a request for access to an application from the client device 150a, 150b the user is operating to the cloud platform 307. The request may be initiated by the user inputting a URL into the browser running on the client device 150a, 150b the user is using. In an aspect, the URL may substantially have the format https://<appname>-<tenantname>.dispatcher.hana.ondemand.com. From 601, process flow 600 proceeds to 602.

At 602, the load balancer 309 analyzes the request URL. In an aspect, the URLs pointing to the subdomain *.dispatcher.hana.ondemand.com may be forwarded to the dispatcher 310. From 602, process flow 600 proceeds to 603.

At 603, the dispatcher 310 analyzes the URL to identify the application (e.g. application name) and/or the corresponding repository 315 indicated by the URL. For example, the dispatcher 310 analyzes an application descriptor (e.g., as stored in the Git repository 315). The dispatcher 310 may decide whether to serve static content or to forward a call to an on-premise/on-demand service 312 based on the application descriptor.

At 604, static content is served from the Git repository 315. From 604, process flow 600 stops.

At 605, the application may be run, e.g. by executing on-demand/on-premise services 312 on a backend server (e.g. on server 120 or third party system 203). From 605, process flow 600 stops.

In an aspect of process 600, the process may further comprise: receiving, at the server and from a second client device, a first request to access the application, wherein the first request includes a uniform resource locator; determining, by the server and from the uniform resource locator, the application and the corresponding location in the repository where the updated frame of the application is stored; and providing, by the server and to the second client device, access to the application associated with the updated frame. In an aspect of process 600, the process may further comprise: receiving, at the server and from a third client device, a second request to access the application, wherein the request includes a second uniform resource locator and is received after the first request but before the access to the application associated with the updated frame is provided; determining, by the server and from the second uniform resource locator, the application and the corresponding location in the repository where the updated frame of the application is stored; and providing, by the server and to the third client device, access to the application associated with the updated frame.

In an aspect, a developer can store his artifacts directly in a cloud source code repository and the runtime may serve artifacts directly from this repository. This may eliminate the need for a separate build and deployment process. Furthermore no resources in form of additional virtual machines may need to be managed by the end user, as these are provided by the service provider. The service provider may also ensure scalability and availability of the central runtime. In an aspect, inside of the source code repository an application can exist in multiple versions. Each version can be accessed directly through the runtime. Setting a specific version live may be a matter of configuration instead of redeployment. In an aspect, having the information about source code artifacts the runtime can provide very efficient caching strategies including eTag creation based on application versions. In an aspect, having the information about source code artifacts the runtime can provide new versions of an application by only delivering changed files compared to a version a consumer has already loaded. Applications can connect to arbitrary backend systems via a centrally provided reverse proxy just by configuration without coding. It may be possible to automate the distribution of artifacts to existing content delivery networks.

The preceding figures and accompanying description illustrate example processes and computer implementable techniques. But network environment 100, 300 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, each network environment may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art.

What is claimed is:

1. A computer-implemented method for deploying a mobile cloud application, the method comprising:
   receiving, at a server and from a remote client device, a first request to create a frame for the application, wherein the application includes a cloud-based portion and a local portion, wherein the local portion defines operations of the application associated with the remote client device, wherein the frame is an incomplete generic version of the application excluding the local portion but including the cloud-based portion which defines operations of the application associated with a cloud-based computing system remote from the remote client device and which ensure at least communication functionality between the remote client device and arbitrary third-party or backend systems, wherein the frame is served by the cloud-based computing system to a developer and is configured to be accessed by the remote client device to be augmented on the remote client device, and wherein the developer only develops the local portion without developing the frame to ensure that the frame is programmed in a generic manner to be flexibly used with the arbitrary third-party or backend systems;
   storing, by the server, the frame of the application in a repository;
   generating, by the server, an identifier associated with the frame;
   initiating, by the server, a copying of the repository to a workspace; and
   receiving, by the repository or the workspace and from the remote client, a pushing command including the identifier to update the frame stored in the repository or the workspace with application data associated with a created, modified or deleted version of the application.

2. The method of claim 1, wherein the workspace is a local workspace associated with the client device, or wherein the workspace is a cloud workspace located in a cloud computing environment associated with the server.

3. The method of claim 1, wherein the repository is a cloud repository located in a cloud computing environment associated with the server.

4. The method of claim 3, wherein the repository is a Git or Gerrit repository.

5. The method of claim 1, wherein the frame is static content.

6. The method of claim 1, wherein the identifier is a uniform resource locator (URL) that identifies the application and the associated repository.

7. The method of claim 6, wherein the identifier includes a name of the application and an identifier of a location in the associated repository.

8. The method of claim 1, further comprising:
   receiving, at the server and from the remote client device, a command to test the created or modified version of the application;
   accessing, by the server, an on-premise or an on-demand service to retrieve data for testing of the created or modified version of the application under use of the retrieved data; and providing test results to the client device.

9. The method of claim 8, wherein the testing of the created or modified version of the application under use of the retrieved data comprises accessing the application data stored in the repository or the workspace.

10. The method of claim 1, further comprising:
    receiving, at the server and from a second client device, a first request to access the application, wherein the first request includes a uniform resource locator;
    determining, by the server and from the uniform resource locator, the application and the corresponding location in the repository where the updated frame of the application is stored; and providing, by the server and to the second client device, access to the application associated with the updated frame.

11. The method of claim 10, further comprising:
    receiving, at the server and from a third client device, a second request to access the application, wherein the request includes a second uniform resource locator and is received after the first request but before the access to the application associated with the updated frame is provided in response to the first request to access the application;

determining, by the server and from the second uniform resource locator, the application and the corresponding location in the repository where the updated frame of the application is stored;

providing, by the server and to the third client device, access to the application associated with the updated frame.

12. The method of claim 1, further comprising:

receiving, at the server and from a second remote client device, a second request to create a second frame for the application, wherein the second request is received after the first request but before the first frame is updated;

storing, by the server, the second frame of the application in a repository; generating, by the server, a second identifier associated with the second frame; initiating, by the server, a copying of the repository to the workspace; receiving, by the repository or the workspace and from the second remote client, a pushing command including the second identifier to update the second frame stored in the repository or the workspace with second application data associated with a created, modified or deleted second version of the application.

13. The method of claim 12, further comprising:

receiving, at the server and from the second remote client device, a command to test the created or modified second version of the application;

accessing, by the server, an on-premise or an on-demand service to retrieve data for testing of the created or modified second version of the application under use of the retrieved data; and providing test results to the second remote client device.

14. The method of claim 13, wherein the testing of the created or modified version of the application under use of the retrieved data comprises accessing the application data stored in the repository or the workspace.

15. A computer program product encoded on a non-transitory, tangible storage medium, the product comprising computer readable instructions for causing one or more computers to perform operations for providing a deployment of a mobile cloud application, the operations comprising:

receiving, at a server and from a remote client device, a first request to create a frame for the application, wherein the application includes a cloud-based portion and a local portion, wherein the local portion defines operations of the application associated with the remote client device, wherein the frame is an incomplete generic version of the application excluding the local portion but including the cloud-based portion which defines operations of the application associated with a cloud-based computing system remote from the remote client device and which ensure at least communication functionality between the remote client device and arbitrary third-party or backend systems, wherein the frame is served by the cloud-based computing system to a developer and is configured to be accessed by the remote client device to be augmented on the remote client device, and wherein the developer only develops the local portion without developing the frame to ensure that the frame is programmed in a generic manner to be flexibly used with the arbitrary third-party or backend systems;

storing, by the server, the frame of the application in a repository; generating, by the server, an identifier associated with the frame; initiating, by the server, a copying of the repository to a workspace; receiving, by the repository or the workspace and from the remote client, a pushing command including the identifier to update the frame stored in the repository or the workspace with application data associated with a created, modified or deleted version of the application.

16. A cloud computing system for providing a deployment of mobile cloud applications, the system comprising:

one or more servers; and a processor-readable medium coupled to the one or more servers having instructions stored thereon which, when executed by the one or more servers, cause the one or more servers to perform operations comprising:

receiving, at the one or more servers and from the remote client device, a first request to create a frame for the application, wherein the application includes a cloud-based portion and a local portion, wherein the local portion defines operations of the application associated with the remote client device, wherein the frame is an incomplete generic version of the application excluding the local portion but including the cloud-based portion which defines operations of the application associated with a cloud-based computing system remote from the remote client device and which ensure at least communication functionality between the remote client device and arbitrary third-party or backend systems, wherein the frame is served by the cloud-based computing system to a developer and is configured to be accessed by the remote client device to be augmented on the remote client device, and wherein the developer only develops the local portion without developing the frame to ensure that the frame is programmed in a generic manner to be flexibly used with the arbitrary third-party or backend systems;

storing, by the one or more servers, the frame of the application in a repository; generating, by the server, an identifier associated with the frame; initiating, by the one or more servers, a copying of the repository to a workspace; receiving, by the repository or the workspace and from the remote client, a pushing command including the identifier to update the frame stored in the repository or the workspace with application data associated with a created, modified or deleted version of the application.

17. The system of claim 16, wherein the workspace is a local workspace associated with the client device, or wherein the workspace is a cloud workspace located on the one or more servers.

18. The system of claim 16, the operations further comprising: receiving, at the one or more servers and from the remote client device, a command to test the created or modified version of the application;

accessing, by the one or more servers, an on-premise or an on-demand service to retrieve data for testing of the created or modified version of the application under use of the retrieved data, wherein the testing of the created or modified version of the application under use of the retrieved data comprises accessing the application data stored in the repository or the workspace; and providing test results to the client device.

19. The system of claim 16, the operations further comprising:

receiving, at the one or more servers and from a second remote client device, a second request to create a second frame for the application, wherein the second request is received after the first request but before the first frame is updated;

storing, by the one or more servers, the second frame of the application in a repository; generating, by the one or more servers, a second identifier associated with the second frame;

initiating, by the one or more servers, a copying of the repository to the workspace; and receiving, by the repository or the workspace and from the second remote client, a pushing command including the second identifier to update the second frame stored in the repository or the workspace with second application data associated with a created, modified or deleted second version of the application.

20. A cloud computing system for providing a deployment of mobile cloud applications, the system comprising: one or more servers; and a processor-readable medium coupled to the one or more servers having instructions stored thereon which, when executed by the one or more servers, cause the one or more servers to perform operations comprising:

receiving, at the one or more servers and from a remote client device, a first request to create a frame for the application, wherein the application includes a cloud-based portion and a local portion, wherein the local portion defines operations of the application associated with the remote client device, wherein the frame is an incomplete generic version of the application excluding the local portion but including the cloud-based portion which defines operations of the application associated with a cloud-based computing system remote from the remote client device and which ensure at least communication functionality between the remote client device and arbitrary third-party or backend systems, wherein the frame is served by the cloud-based computing system to a developer and is configured to be accessed by the remote client device to be augmented on the remote client device, and wherein the developer only develops the local portion without developing the frame to ensure that the frame is programmed in a generic manner to be flexibly used with the arbitrary third-party or backend systems;

storing, by the one or more servers, the frame of the application in a repository; generating, by the server, an identifier associated with the frame; initiating, by the one or more servers, a copying of the repository to a workspace, wherein the workspace is a local workspace associated with the remote client device, or wherein the workspace is a cloud workspace located on the one or more servers;

receiving, by the repository or the workspace and from the remote client, a pushing command including the identifier to update the frame stored in the repository or the workspace with application data associated with a created, modified or deleted version of the application;

receiving, at the one or more servers and from the remote client device, a command to test the created or modified version of the application;

accessing, by the one or more servers, an on-premise or an on-demand service to retrieve data for testing of the created or modified version of the application under use of the retrieved data, wherein the testing of the created or modified version of the application under use of the retrieved data comprises accessing the application data stored in the repository or the workspace; and providing test results to the client device.

\* \* \* \* \*